US009650960B2

(12) United States Patent
Vertenoeuil et al.

(10) Patent No.: US 9,650,960 B2
(45) Date of Patent: May 16, 2017

(54) FUEL CIRCUIT OF A TURBINE ENGINE

(71) Applicant: SNECMA, Paris (FR)

(72) Inventors: Philippe Vertenoeuil, Paris (FR); Gilles Brun, Paris (FR)

(73) Assignee: SNECMA, Paris (FR)

( * ) Notice: Subject to any disclaimer, the term of this patent is extended or adjusted under 35 U.S.C. 154(b) by 646 days.

(21) Appl. No.: 14/109,284

(22) Filed: Dec. 17, 2013

(65) Prior Publication Data
US 2014/0165571 A1 Jun. 19, 2014

(30) Foreign Application Priority Data

Dec. 18, 2012 (FR) ...................................... 12 62236

(51) Int. Cl.
F02C 7/22 (2006.01)
F02C 9/26 (2006.01)
(Continued)

(52) U.S. Cl.
CPC ................ *F02C 7/22* (2013.01); *F02C 7/232* (2013.01); *F02C 7/236* (2013.01); *F02C 9/26* (2013.01);
(Continued)

(58) Field of Classification Search
CPC .. F02C 7/22; F02C 7/232; F02C 7/236; F02C 9/26; F02C 9/263; F02C 9/36;
(Continued)

(56) References Cited

U.S. PATENT DOCUMENTS 3,664,509 A    5/1972  Grill
5,152,146 A *  10/1992 Butler ....................... F02C 7/14
                                                             60/734
(Continued)

FOREIGN PATENT DOCUMENTS

EP    0 796 987 A1    9/1997
FR    2 923 861 A1    5/2009
GB      892692         3/1962

OTHER PUBLICATIONS

French Preliminary Search Report issued Sep. 27, 2013, in French Application No. 12 62236 filed Dec. 18, 2012 (with English Translation of Categories of Cited Documents).
(Continued)

*Primary Examiner* — Pascal M Bui Pho
*Assistant Examiner* — Thuyhang Nguyen
(74) *Attorney, Agent, or Firm* — Oblon, McClelland, Maier & Neustadt, L.L.P.

(57) ABSTRACT

A fuel circuit for a turbine engine is provided. The fuel circuit includes a fuel return valve connected to the main circuit and to a fuel tank, the valve being capable of adopting an open position in which the valve allows an excess quantity of fuel to be returned to the tank, and a closed configuration in which the return of fuel to the tank is blocked; a first hydraulic line connecting the valve to the main circuit, and including a first filter; a second hydraulic line connecting the valve to the main circuit, and including a second filter; and an intermediate hydraulic line connected to the first and second lines downstream from the filters, the first and second lines being hydraulically connected together by the intermediate line when the valve is in the closed configuration.

11 Claims, 2 Drawing Sheets

(51) Int. Cl.
*F02C 7/232* (2006.01)
*F02C 7/236* (2006.01)
*F02C 9/36* (2006.01)

(52) U.S. Cl.
CPC ............... *F02C 9/263* (2013.01); *F02C 9/36* (2013.01); *F05D 2260/601* (2013.01); *F05D 2260/606* (2013.01); *F05D 2260/607* (2013.01); *Y02T 50/671* (2013.01); *Y02T 50/675* (2013.01)

(58) Field of Classification Search
CPC ......... F05D 2260/601; F05D 2260/606; F05D 2260/607
See application file for complete search history.

(56) References Cited

U.S. PATENT DOCUMENTS

| | | | |
|---|---|---|---|
| 5,832,717 A | 11/1998 | Halin | |
| 2010/0058733 A1* | 3/2010 | Lawrence | ............... F02C 7/232 60/39.094 |
| 2011/0139123 A1* | 6/2011 | Brocard | ................... F02C 7/22 123/458 |

OTHER PUBLICATIONS

U.S. Appl. No. 14/652,999, filed Jun. 17, 2015, Vertenoeuil.

\* cited by examiner

FUEL CIRCUIT OF A TURBINE ENGINE

FIELD OF THE INVENTION

The present description relates to a fuel circuit of a turbine engine, and to a turbine engine including such a circuit.

By way of example, it may be a fuel circuit of a turbine engine for use on land or in aviation (turbojet or turboprop) and, more particularly, it may be a fuel circuit of an airplane turbojet.

STATE OF THE PRIOR ART

A known example of an airplane turbojet fuel circuit is shown in accompanying FIG. 1. The circuit 1 comprises a main circuit 2 with a low-pressure pump 16 connected to the fuel tank 10 of the airplane, a high-pressure pump 18, a heat exchanger 12, and a metering unit 13 for feeding fuel to the combustion chamber 11. The circuit 1 also incorporates a fuel return valve (FRV).

The purpose of the FRV is to return a certain quantity of hot excess fuel 22 (referred to as "hot" fuel) that has passed through the heat exchanger 12 back to the tank 10 in order to improve the thermal equilibrium of the system. FRVs are appreciated for their effectiveness and their compactness. The temperature of the fuel returned to the tank 10 via the FRV is lowered by mixing the hot fuel 22 as taken between the heat exchanger 12 and the high-pressure pump 18 (or HP pump) with cooler fuel 21 (referred to as "cold" fuel) taken from the low-pressure pump 16 (or LP pump).

FRV technology makes use of small operating clearances, whether for the movable valve members or for the sealing seats that are generally present in such valves. The valve members are used for opening, closing, and controlling the flow rate of the fuel returned to the tank. Since the operating clearances in an FRV are small, they are particularly sensitive to clogging and also to wear, and they therefore need to be protected against the impurities present in the fuel. That is why the fuel fed to the FRV is filtered beforehand. Thus, in the example of FIG. 1, the hot fuel 22 is preferably filtered by a filter 14 (the main filter of the fuel circuit) that is located at the heat exchanger 12, and the cold fuel 21 is previously filtered by a filter 19 that is associated with the low-pressure pump 16.

However, recent generations of airplane turbojet present new layouts in which the filters 14 and 19 are no longer present.

There therefore exists a need for a novel solution enabling the fuel fed to the FRV to be filtered in order to protect it from pollution or contamination, and thus preserving proper operation of the FRV throughout its required lifetime.

SUMMARY OF THE INVENTION

The present description relates to a turbine engine fuel circuit, the circuit comprising:
- a fuel return valve, or FRV, configured to be connected firstly to the main fuel circuit of a turbine engine and secondly to a fuel tank, the FRV being capable of adopting an open configuration in which the FRV allows an excess quantity of fuel coming from the main circuit to be returned to the tank, and a closed configuration in which the return of fuel to the tank is blocked;
- a first hydraulic line (or cold line) connecting the FRV to the main circuit and including a first filter;
- a second hydraulic line (or hot line) connecting the FRV to the main circuit and including a second filter; and
- an intermediate hydraulic line connected to the first line downstream from the first filter and connected to the second line downstream from the second filter, the first and second lines being hydraulically connected together by the intermediate line when the FRV is in the closed configuration.

The term "hydraulic line" is used herein to mean a system of ducts (e.g. pipes, hoses, etc.) or of passages that are connected together to convey and transport a liquid, specifically fuel.

The main circuit corresponds to the portion of the fuel circuit that is dedicated to feeding the combustion chamber of the turbine engine. The fuel flowing therein is taken upstream from a fuel tank, and it is injected downstream into the combustion chamber. Typically, the main circuit includes an LP pump serving to pressurize and impose flow rate, and an HP pump that imposes the flow rate.

In the present description, "upstream" and "downstream" are defined relative to the normal flow direction of the fuel. In the first and second lines, it is considered that the normal flow direction is the direction of the flow when the FRV is open (i.e. when the fuel is being returned to the tank).

The intermediate line that hydraulically interconnects the first and second lines serves to allow fuel to flow between these two lines (this is referred to as "recirculation") when the valve is in the closed position (i.e. when the fuel is not being returned to the tank). Thus, when the FRV is closed, the pressure difference that exists naturally in the circuit between the first and second lines and that reverses as a function of the operating point of the turbine engine, is used to create a flow in the direction opposite to the nominal flow direction in one or the other of the filters, thereby cleaning the filter. The filters may be of any type or of any shape, providing they can be cleaned by a flow of fuel in the direction opposite to the normal flow direction ("backwashing"). In an embodiment, the filters are strainers.

In the present solution, two filters and one intermediate line are thus incorporated in the feed circuit of the FRV.

Compared with other solutions, the solution described presents the advantage of being simple, compact (an aspect that is important in turbojets of the most recent generation), and of limited weight.

In particular, it makes it possible to simplify the design and the fabrication of elements of the main circuit. For example, compared with the prior art example of FIG. 1, the present solution simplifies the design and the fabrication of the LP pump, since it is no longer necessary to associate a filter with this pump or with any other equipment in the main circuit (thereby economizing on an interface and a pipe). Also, the fuel fed to the FRV may be taken from the main fuel circuit independently of the presence and/or the position of any filters (and in particular of the main filter) in the main circuit. Finally, since the first and second filters are dedicated only to filtering the fuel being fed to the FRV, the degree of filtration they provide can be determined depending on the needs specific to the FRV, and this degree of filtration has no effect on the filtering cascade in the main circuit. The fact that the fuel is filtered depending on the needs specific to the FRV can also make it possible to simplify the design of the FRV, thus leading to a saving in weight and an improvement in lifetime.

The present solution also avoids any need to incorporate a self-cleaning filter in the FRV. A filter incorporated in the FRV would present drawbacks since the FRV is mounted on the turbine engine at a relatively large distance from the main fuel circuit. Consequently, if a self-cleaning filter were incorporated in the FRV, it would be necessary to provide a long circuit loop connected to the main circuit and going to the self-cleaning filter in order to clean it. However, such an additional long loop would give rise to problems of weight and bulk.

Finally, the present solution also creates a flow of recirculated fuel when the FRV is closed, i.e. when the fuel circuit is in a "cold" condition. This may be considered as being an advantage when dimensioning the heat exchanger that is to be found in this recirculation and that is then used for heating the fuel. This also makes it possible to cool the FRV while performing tests on its ability to withstand fire while the FRV is in the closed position.

It should be observed that the degree of filtration of the first and second filters must be sufficiently small to be suitable for protecting the FRV effectively. This degree of filtration is typically less than or equal to 50 micrometers (μm), and is preferably about 45 μm. However, the smaller the degree of filtration, the quicker the filter becomes clogged and the greater the amount of cleaning required by the first and second filters.

The fact that the first and second filters are cleaned when the FRV is closed greatly reduces, and generally even eliminates, any risk of the filters clogging. There is therefore no need to provide a bypass system for bypassing each filter in the event of clogging. Furthermore, since the FRV is generally used only under conditions where the fuel is hot, there is no risk of the filter icing, and there is therefore no need to provide a bypass system for bypassing the filter in the event of icing. Also, and advantageously, the circuit does not have any bypass systems for bypassing the first and second filters. This enables the design of the circuit to be simplified and its weight and bulk to be reduced.

In certain embodiments, the first and second lines are hydraulically connected together by the intermediate line only while the FRV is in the closed configuration.

In certain embodiments, the intermediate hydraulic line passes through the inside of the FRV, with the hydraulic connection between the first and second lines being established or interrupted by actuating the FRV. In other words, a passage of the intermediate line is provided inside the FRV. This passage is open or closed depending on the position of the FRV. When the FRV is closed, the passage is open so as to establish the hydraulic connection between the first and second lines, and thus enable the filters to be cleaned. In contrast, when the FRV is open, the passage is closed so as to interrupt the hydraulic connection between the first and second lines and enable the fuel to return to the tank.

In certain embodiments, the FRV comprises a valve member that is movable between an open position corresponding to the open configuration of the valve, and a closed position corresponding to the closed configuration of the valve, the valve member defining a chamber via which the intermediate line passes when the valve member is in the closed position. By way of example, the movement of the valve member is controlled electrically or hydraulically.

In certain embodiments, in the intermediate line, the circuit includes a constriction that is adjustable in order to calibrate the flow rate of the fuel flowing in said line as a function of the pressures that exist in the fuel circuit.

In certain embodiments, the circuit has first and second pressure regulators, the first regulator being arranged in the first line between the point of connection between the intermediate line and the FRV, and the second regulator being arranged in the second line between the point of connection between the intermediate line and the FRV.

These two pressure regulators operate when the FRV is open and is returning fuel to the tank. They enable the pressure in each of the first and second lines to be modulated downstream from the regulators so as to return a mixture of hot and cold fuel to the tank at a rate that is constant regardless of the pressures at the tapping points on the main circuit.

In certain embodiments, the main circuit include a low-pressure pump, a high-pressure pump, and between them a heat exchanger, and the first line is connected to the main circuit upstream from the heat exchanger and the second line is connected to the main circuit downstream from the heat exchanger.

In certain embodiments, the first line is connected to the main circuit between the low-pressure pump and a heat exchanger in order to filter a flow of cold fuel going to the FRV.

In certain embodiments, the second line is connected to the main circuit between the heat exchanger and the high-pressure pump in order to filter a flow of hot fuel going to the FRV.

In certain embodiments, the main circuit includes a hydraulic energy recovery member, which member is situated between the low-pressure pump and the heat exchanger. The first line is connected to the main circuit between the low-pressure pump and the energy recovery member. In particular, the energy recovery member is a jet pump. The energy recovery member serves to entrain the flow of low-pressure fuel by means of the flow of excess high-pressure fuel being returned upstream from the main circuit. This increase in speed is then transformed back into the pressure. The pressure at the inlet to the HP pump is thus greater than in a system without a recovery member. The energy recovery member is activated or not activated depending on the speed at which the turbine engine is operating, and this has the consequence of causing the pressure at the hot tapping point to vary greatly (i.e. the pressure at the connection of the hot line to the main circuit), independently of the pressure at the cold tapping point (i.e. the pressure at the connection of the cold line to the main circuit).

It is the activation of the energy recovery member (i.e. depending on whether it is activated or deactivated) that determines whether the pressure difference is positive between the first and second hydraulic lines or between the second and first hydraulic lines, with this having the consequence of backwashing respectively the filter of the second line or of the first line.

The present description also relates to a turbine engine including a fuel circuit as described above.

The above-described characteristics and advantages, and others, appear on reading the following detailed description of an embodiment of the proposed fuel circuit. The detailed description refers to the accompanying drawings.

BRIEF DESCRIPTION OF THE DRAWINGS

The accompanying drawings are diagrammatic and not to scale; they seek above all to show the principles of the invention.

In the drawings, from one figure to another, elements (or element portions) that are identical are identified by the same reference signs.

DETAILED DESCRIPTION OF EMBODIMENT(S)

Embodiments are described in detail below, with reference to the accompanying drawings. These examples show the characteristics and the advantages of the invention. Nevertheless, it should be recalled that the invention is not limited to these examples.

Figure 1:
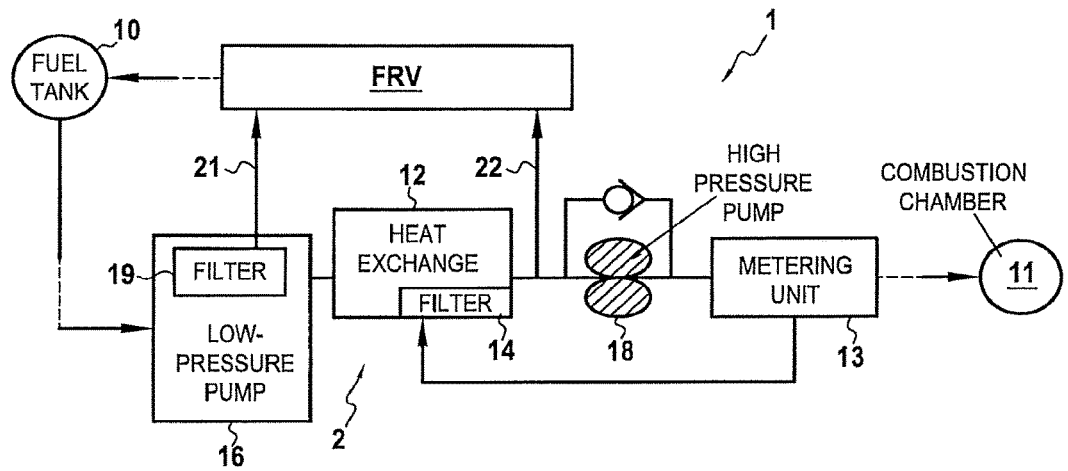
FIG. 1 shows a prior art example of a turbine engine fuel circuit.

FIG. 1 shows a prior art example of an airplane turbine engine fuel circuit. This prior art circuit is described above.

Figure 2:
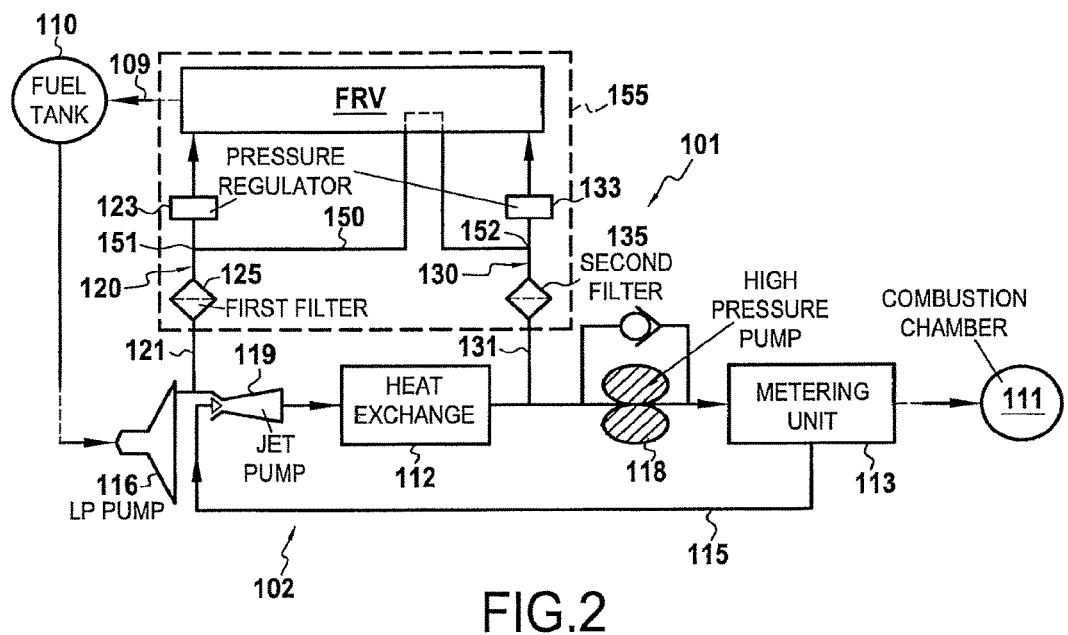
FIG. 2 shows an example of a turbine engine fuel circuit in accordance with the present description.

FIG. 2 shows a fuel circuit 101 for a turbine engine, more particularly for an airplane turbojet. The circuit 101 comprises a main circuit 102 extending between the fuel tank 110 of the airplane and the combustion chamber 111 of the turbojet.

Going from upstream to downstream, the main circuit 102 comprises: a low-pressure pump (or LP pump) 116 connected to the tank 110; a jet pump 119; a heat exchanger 112; a high-pressure pump (or HP pump) 118; and a metering unit 113 for feeding fuel to the combustion chamber 111. A filter (not shown) may be provided between the HP pump 118 and the metering unit 113.

A recirculation loop 115 serves to return any excess fuel from the metering unit 113 to the jet pump 119. The jet pump 119 makes it possible to entrain in the flow of low-pressure fuel by using the flow of excess a high-pressure fuel as returned by the metering unit 113 via the loop 115. This increase in speed is then re-transformed into pressure by the diffuser of the jet pump 119. The jet pump 119 is activated or not activated depending on different stages of flight.

The circuit 101 also includes an FRV that makes it possible to return an excess quantity of hot fuel 131 to the tank 110 after it has passed through the heat exchanger 112. The temperature of the fuel returned to the tank 110 via the FRV is lowered by mixing the hot fuel 131 taken downstream from the heat exchanger 112 with the cold fuel 121 taken upstream from the heat exchanger 112.

Unlike the circuit of FIG. 1, the circuit 101 does not have a main filter associated with the heat exchanger 112, nor does it have a filter associated with the LP pump 116. In contrast, the circuit has first and second filters 125, 135 incorporated respectively in the first and second hydraulic lines 120, 130 connecting the FRV to the main circuit 102. It should also be observed that the FRV of the circuit 101 differs from that of the circuit 1 in FIG. 1, since the FRV of FIGS. 2 and 3 has an intermediate hydraulic line 150 passing therethrough, as explained below.

The first hydraulic line, also referred to as the "cold" line 120, is used for conveying cold fuel 121 and it connects the FRV to the main circuit 102. From upstream to downstream, it comprises the filter 125 and a pressure regulator 123. This cold line 120 is connected to the main circuit 102 upstream from the heat exchanger 112, between the LP pump 116 and the jet pump 119.

The second hydraulic line, also referred to as the "hot" line 130, serves to convey a hot fuel 131 and it connects the FRV to the main circuit 102. From upstream the downstream, it comprises the filter 135 and a pressure regulator 133. This hot line 130 is connected to the main circuit 102 between the heat exchanger 112 and the HP pump 118.

An intermediate hydraulic line 150 extends between the hot and cold lines 130 and 120. This intermediate line 150 is connected to the cold line 120 at a connection point 151 situated downstream from the first filter 125, and more particularly situated between the first filter 125 and the first pressure regulator 123. Likewise, the link 150 is connected to the hot line 130 at a connection point 152 situated downstream from the second filter 135, and more particularly situated between the second filter 135 and the second pressure regulator 133.

The hot and cold lines 120 and 130 are hydraulically connected together by the intermediate line 150 when the FRV is in the closed configuration. In contrast, when the FRV is in the open configuration, the connection between the hot and cold lines 120 and 130 is interrupted.

The FRV, the intermediate line 150, the first pressure regulator 123, the second pressure regulator 133, the first filter 125, and the second filter 135 may constitute a non-separable assembly, referred to below as the "fuel return system" 155. The fuel return system 155 may be in the form of a unitary component having two fuel inlets (one inlet for hot fuel and one inlet for cold fuel) and one fuel outlet leading to the tank 110. The elements of the fuel return system 155 may be protected by a common housing. The fuel return system 155 may be mounted on the turbine engine.

Figure 3:
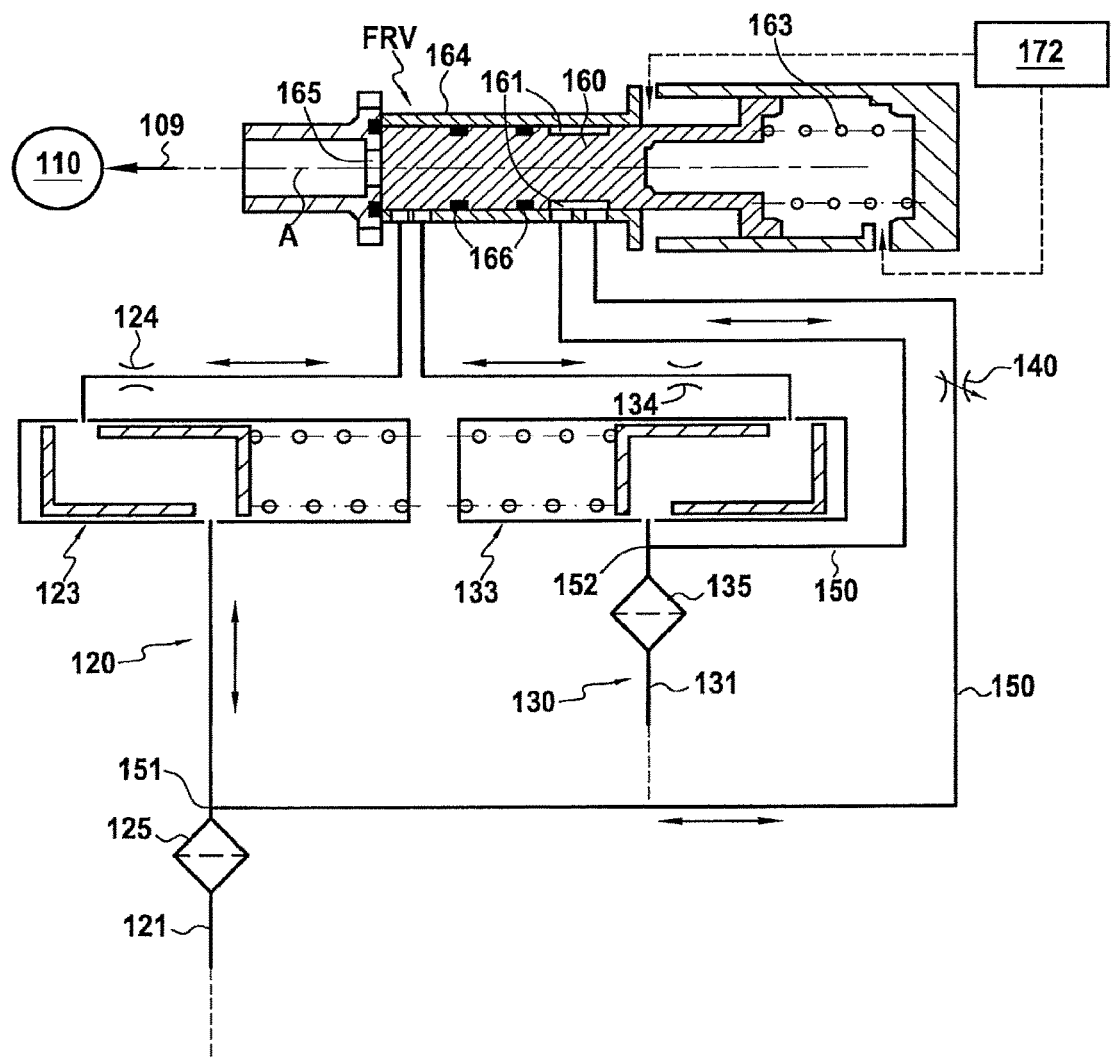
FIG. 3 is a detail view of the figure to circuit.

In this example, the intermediate line 150 passes via the inside of the FRV, the hydraulic connection between the lines 120 and 130 being established or interrupted by actuating the FRV. To do this, as shown in FIG. 3, the FRV has a valve member 160, also referred to as a slide, mounted to slide along an axis A. The valve member 160 is mounted to slide in a sheath 164 surrounding the outside of the valve member 160 and extending along the axis A.

The valve member 160 is mounted facing an access opening 165 to the hydraulic line 109 leading to the tank 110. The valve member 160 is movable between an open position (to the right in FIG. 3) in which it does not close the opening 165, and a closed position (to the left in FIG. 3) in which it closes the opening 165, thus preventing fuel from returning to the tank 110. In FIG. 3, the valve member 160 is shown in the closed position. The valve member 160 thus performs an on/off function, being in a position that is either open or closed in the circuit for returning fuel to the airplane tank 110. The valve member 160 is electrically or hydraulically controlled by a control device 172. The valve member 160 is also mounted on a spring 163 urging the valve member 160 towards its closed position. The control device 172 therefore needs to generate a force that is greater than the return force of the spring in order to open the FRV.

The intermediate line 150 passes inside the valve member 160. In this example, a chamber 161 is defined between the valve member 160 and the sheath 164. The chamber 161 may be generally cylindrical in shape, as shown in FIG. 3. In the vicinity of the chamber 161, two dynamic seals 166 are incorporated that are capable of withstanding the back and forth movements of the slide so as to isolate the chamber 161 when the FRV is open, and thus force the fuel towards the tank 110 by making it pass through the regulators 123, 133, and then through a space (not shown in FIG. 3) that lies between the front end of the valve member 160 and the opening 165, and then via the opening 165.

Thus, during operating stages of the turbine engine in which the FRV is open, the hydraulic connection between the hot and cold lines 130, 120 is interrupted and the fuel passes through each of the filters 125, 135 in its normal flow direction, such that the fuel is cleared or cleaned of its impurities (i.e. impurities of sizes deemed to be too great are captured by said filters) prior to reaching the FRV. In this way, the FRV is protected against pollution and the proper operation of the FRV is preserved throughout its entire lifetime.

Conversely, during operating stages of the turbine engine in which the FRV is closed, the hydraulic connection between the hot and cold lines 130, 120 is established, and the fuel passes through one or the other of the filters 125, 135 in a direction opposite to the normal flow direction, such that the impurities that have been captured by the filter 125 or 135 become detached therefrom under the effect of the reverse flow of the fuel. These impurities are returned to the main circuit 102, which circuit is designed to be capable of accepting particles of this size. The filter 125 or 135 is thus cleaned.

A pressure difference naturally exists between the cold and hot lines 120, 130. This difference is due to the head loss between the two tapping points where fuel is taken from the main circuit 102. The greater the head loss, the greater the flow rate of the generated backwashing. The head loss between the two tapping points is conventionally at least a few bars, depending on the circuit under consideration, and it may reach 5 bars, for example. In the example shown, it should be observed that the head loss is generally associated with a high flow rate of injected fuel and with a fuel temperature that is relatively cold, since otherwise the valve FRV would be open.

This pressure difference between the hot and cold lines 120, 130 creates a flow of fuel from the cold line 120 towards the hot line 130 that enables the filter 135 to be backwashed. This flow also depends on the constriction created by the clogged filter 135, which depends on the extent to which it is clogged. Generally, the clogging level of the filter 135 is not too great, since it is backwashed on each flight of the airplane. The flow rate generated is therefore not excessively diminished by the clogging level of the filter 135.

Furthermore, when the jet pump 119 is activated, it causes the pressure in the hot line 130 to be greater than that in the cold line 120, thereby creating a flow of fuel from the hot line 130 towards the cold line 120, thus enabling the filter 125 to be backwashed. Thus, the filter 125 is backwashed at certain stages of flight in which the FRV is closed and the jet pump 119 is activated. It should be observed that the pressure difference generated by the jet pump 119 may be very large, for example it may be as much as 35 bars. As a result, the backwashing flow rate of the filter 125 may also be very large. However, the greater the backwashing flow rate of the filter 125, the shorter the time required to perform backwashing. Also, the fact that the above-mentioned conditions are satisfied on a few occasions and/or for little time during a flight cycle, does not raise any difficulty. In any event, these conditions are satisfied at least once per flight.

It should be observed that the first filter 125 is subjected to more clogging than the filter 135, since the filter 125 generally passes fuel that has not yet been filtered. The filter 135 also generally passes fuel that has not been filtered, but this fuel is diluted in a larger volume corresponding to the volume of fuel in the recirculation loop 115. Conventionally, the flow rate in the recirculation loop 115 is at least five times greater than the flow rate in the injection line. The concentration of impurities in the fuel reaching the filter 135 is therefore often at least five times smaller than that of the fuel reaching the filter 125.

Downstream from the connection points 151, 152 of the intermediate line 150, the hot and cold lines 120, 130 also include respectively the first and second pressure regulators 123, 133, and first and second constrictions 124, 134 (see FIG. 3). The two regulators 123, 133 shown in detail in FIG. 3 operate only when the FRV is in the open position, and they send fuel to the tank 110 via the return line 109.

Finally, in order to control the flow rate of fuel in the intermediate line 150, an adjustable constriction 140 is provided in this intermediate line, as shown in FIG. 3. In this example, the constriction 140 is situated between the connection point 151 and the FRV. Thus, depending on the systems and on the backwashing requirements of the filters 125 and 135, the constriction 140 is adjusted to modify the flow rate of fuel between the cold and hot lines 120, 130 when the FRV is closed.

The embodiments or examples described in the present description are given by way of non-limiting illustration, and in the light of this description, a person skilled in the art can easily modify these embodiments or examples, or can envisage others, while remaining within the scope of the invention.

Furthermore, the various characteristics of these embodiments or examples may be used on their own or they may be used in combination. When they are used in combination, the characteristics may be as described above or they may be different, the invention not being limited to the specific combinations described in the present description. In particular, unless specified to the contrary, a characteristic described by way of example with reference to one particular embodiment, may be applied in analogous manner to any other embodiment or example.

What is claimed is:

1. A turbine engine fuel circuit comprising:
    a fuel return valve configured to be connected firstly to a main fuel circuit of a turbine engine and secondly to a fuel tank, the fuel return valve being capable of adopting an open configuration in which the fuel return valve allows an excess quantity of fuel coming from the main fuel circuit to be returned to the fuel tank, and a closed configuration in which the return of fuel to the fuel tank is blocked;
    a first hydraulic line connecting the fuel return valve to the main fuel circuit and including a first filter;
    a second hydraulic line connecting the fuel return valve to the main fuel circuit and including a second filter; and
    an intermediate hydraulic line connected to the first hydraulic line downstream from the first filter, and connected to the second hydraulic line downstream from the second filter, the first and second hydraulic lines being hydraulically connected together by the intermediate hydraulic line when the fuel return valve is in the closed configuration; and
    wherein the first and second hydraulic lines are hydraulically connected together by the intermediate hydraulic line only when the fuel return valve is in the closed configuration.

2. The fuel circuit according to claim 1, wherein the intermediate hydraulic line passes through the inside of the fuel return valve, the hydraulic connection between the first and second hydraulic lines being established or interrupted by actuating the fuel return valve.

3. The fuel circuit according to claim 1, wherein the fuel return valve comprises a valve member that is movable between an open position corresponding to the open configuration of the fuel return valve, and a closed position corresponding to the closed configuration of the fuel return valve, the valve member defining a chamber via which the intermediate hydraulic line passes when the valve member is in the closed position.

4. The fuel circuit according to claim 1, including an adjustable constriction in the intermediate hydraulic line in order to modify the flow rate of fuel in said intermediate hydraulic line.

5. The fuel circuit according to claim 1, including first and second pressure regulators, the first regulator being arranged in the first hydraulic line between the point of connection, between the intermediate hydraulic line and the fuel return valve, and the second regulator being arranged in the second hydraulic line between the connection point of the intermediate hydraulic line and the fuel return valve.

6. The fuel circuit according to claim 1, wherein the main fuel circuit includes a low-pressure pump, a high-pressure pump, and a heat exchanger between the low-pressure pump and the high-pressure pump, and wherein the first hydraulic line is connected to the main fuel circuit upstream from the heat exchanger and the second hydraulic line is connected to the main fuel circuit downstream from the heat exchanger.

7. A turbine engine including a fuel circuit according to claim 1.

8. The fuel circuit according to claim 6, wherein the first hydraulic line is connected to the main fuel circuit between the low pressure pump and the heat exchanger.

9. The fuel circuit according to claim 6, wherein the second hydraulic line is connected to the main fuel circuit between the heat exchanger and the high-pressure pump.

10. The fuel circuit according to claim 6, wherein the main fuel circuit includes a hydraulic energy recovery member, situated between the low-pressure pump and the heat exchanger, and wherein the first hydraulic line is connected to the main fuel circuit between the low-pressure pump and the energy recovery member.

11. The fuel circuit according to claim 10, wherein the hydraulic energy recovery member is a jet pump.

* * * * *